US012584080B2

(12) United States Patent
Yapici et al.

(10) Patent No.: US 12,584,080 B2
(45) Date of Patent: Mar. 24, 2026

(54) GEL-LIKE SHAPED BODY FOR FRAGRANCING TEXTILES DURING THE WASHING PROCESS

(71) Applicant: Henkel AG & Co. KGaA, Duesseldorf (DE)

(72) Inventors: Filiz Yapici, Duesseldorf (DE); Peter Schmiedel, Duesseldorf (DE); Mireia Subinya, Massenbachhausen (DE); Ines Baranski, Cologne (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 778 days.

(21) Appl. No.: 17/533,101

(22) Filed: Nov. 22, 2021

(65) Prior Publication Data

US 2022/0089975 A1 Mar. 24, 2022

Related U.S. Application Data

(63) Continuation of application No. 16/598,530, filed on Oct. 10, 2019, now Pat. No. 11,180,717.

(30) Foreign Application Priority Data

Oct. 10, 2018 (DE) ........................ 102018217340.0

(51) Int. Cl.
*C11D 17/00* (2006.01)
*C11D 3/20* (2006.01)
*C11D 3/50* (2006.01)
*C11D 11/00* (2006.01)

(52) U.S. Cl.
CPC .............. *C11D 3/2096* (2013.01); *C11D 3/50* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 5,643,866 | A * | 7/1997 | Ansari | A61L 9/01 512/4 |
| 11,180,717 | B2 * | 11/2021 | Yapici | C11D 17/0047 |
| 2002/0128163 | A1 * | 9/2002 | Lambino | C11D 3/2068 510/147 |
| 2016/0175470 | A1 * | 6/2016 | Frentzel | A61L 9/02 422/4 |
| 2017/0211019 | A1 * | 7/2017 | Sivik | C11D 3/3749 |
| 2020/0115653 | A1 * | 4/2020 | Yapici | C11D 17/003 |
| 2020/0115655 | A1 * | 4/2020 | Schmiedel | C11D 3/2068 |
| 2020/0115656 | A1 * | 4/2020 | Schmiedel | C11D 3/2065 |
| 2020/0115657 | A1 * | 4/2020 | Schmiedel | C11D 3/2068 |
| 2022/0142332 | A1 * | 5/2022 | Subinya | A45D 37/00 |

FOREIGN PATENT DOCUMENTS

| | | | | |
|---|---|---|---|---|
| EP | 1156101 | A1 * | 11/2001 | C11D 3/221 |
| EP | 1216698 | A1 * | 6/2002 | C11D 1/94 |

* cited by examiner

*Primary Examiner* — Lorna M Douyon
(74) *Attorney, Agent, or Firm* — Bojuan Deng

(57) ABSTRACT

The present invention is in the field of washing and cleaning agents and relates to a fragranced shaped body, including a composition obtained by bringing the following components into contact: (a) at least one gelling agent having a molar mass of <2000 g/mol and (b) at least one fragrance. The invention also relates to a washing or cleaning agent, including the fragranced shaped body according to the invention, a method for producing the fragranced shaped body according to the invention and the use of the fragranced shaped body according to the invention for fragrancing surfaces.

20 Claims, No Drawings

GEL-LIKE SHAPED BODY FOR FRAGRANCING TEXTILES DURING THE WASHING PROCESS

FIELD OF THE INVENTION

The present invention is in the field of washing and cleaning agents and relates to a fragranced shaped body, comprising or consisting of a composition obtained by bringing the following components into contact: (a) at least one gelling agent having a molar mass of <2000 g/mol and (b) at least one fragrance. The invention also relates to a washing or cleaning agent, comprising or consisting of the fragranced shaped body according to the invention, a method for producing the fragranced shaped body according to the invention and the use of the fragranced shaped body according to the invention for fragrancing surfaces.

BACKGROUND OF THE INVENTION

Most commercially available washing and cleaning agents contain volatile fragrances, and therefore the fragrance fades or disappears over time, in particular after washing.

Known fragrance pastilles, which can provide longer lasting fragrancing, are usually based on carrier polymers such as polyethylene glycol (PEG) having an average molecular weight of approximately 2000 to 12000 g/mol and a melting point in the range of 30 to 70° C. The carrier material is the main constituent of the fragrance pastilles and has the disadvantage that, due to the very high proportion of PEG in the formulation, high costs are incurred, and, in addition, the environment is polluted.

Furthermore, owing to their carrier material, the commercially available fragrance pastilles are often very hard, non-elastic pastilles which fall apart and lose their original shape during transportation or if the packaging is shaken more intensely.

Frequently, fragrance pastilles based on PEG also have a non-transparent, inhomogeneous appearance, which is due to the presence of undissolved, non-uniformly distributed solid particles. These properties are not consistent with the aesthetic sense for the consumer.

BRIEF SUMMARY OF THE INVENTION

Therefore, there is a need for fragrance pastilles which are based on alternative raw materials and can replace PEG as the carrier polymer. Furthermore, for reasons of sustainability it would be desirable to use carrier materials from renewable raw materials, in order, for example, to cause less pollution in wastewater. A reduction of the proportion of the carrier material in the fragrance pastilles would also be desirable.

Surprisingly, it has been found that low-molecular gelling agents having a molar mass of <2000 g/mol, preferably dibenzylidene sorbitol (DBS), are suitable, preferably by gelling a perfume emulsion, for forming a fragranced shaped body that overcomes at least one of the above-described disadvantages. These fragranced shaped bodies are preferably formed from elastic, dimensionally stable gels which are translucent and/or transparent. More preferably, the at least one gelling agent having a molar mass <2000 g/mol is used in an amount of up to 20 wt. %, even more preferably up to 10 wt. %.

Therefore, in a first aspect, the invention relates to a fragranced shaped body comprising or consisting of a composition obtained by bringing the following components into contact:

(a) at least one gelling agent having a molar mass of <2000 g/mol,
(b) at least one fragrance,
(c) optionally at least one solvent, and
(d) optionally at least one additive.

In a second aspect, the invention relates to a washing or cleaning agent comprising or consisting of the fragranced shaped body according to the invention.

In a third aspect, a method for producing the fragranced shaped body according to the invention is claimed, comprising or consisting of the following steps:

(i) optionally blending or mixing the at least one gelling agent (a), the optionally present solvent (c) and/or the optionally present additive (d);
(ii) heating the at least one gelling agent (a) or the mixture from step (i), preferably while stirring, to a temperature of 50 to 200° C., preferably 80 to 150° C., more preferably 130° C.;
(iii) allowing the mixture from step (ii) to cool to a temperature of 40 to 90° C., preferably 60 to 80° C., more preferably 70° C.;
(iv) optionally adding the at least one fragrance (b) and/or the optionally present solvent (c) and/or additives (d), preferably while stirring, to the mixture from step (iii);
(v) dropping the mixture from step (iv) onto a belt or sheet, which is preferably temperature controlled, more preferably at 15 to 30° C., most preferably at 23° C., or filling the mixture from step (iv) into a shaping mold, which is preferably temperature controlled, more preferably at 15 to 30° C., most preferably at 23° C.;
(vi) allowing the mixture from step (v) to cool to room temperature, preferably to 20 to 25° C.;
(vii) optionally also removing the shaped body from step (vi) from the mold;
(viii) optionally coating the mold from step (vi) or (vii) with the at least one fragrance (b) and/or with a powdered material, preferably potato starch, and/or with a water-soluble coating, preferably of polyvinyl alcohol;
(ix) optionally filling the fragranced shaped body according to one of steps (vi), (vii) or (viii).

In a fourth aspect, the invention relates to the use of the fragranced shaped body according to the invention for fragrancing soft surfaces or textiles or for fragrancing hard surfaces.

"At least one," as used herein, refers to 1 or more, for example 2, 3, 4, 5, 6, 7, 8, 9 or more. In the context of the invention described herein, this indication does not refer to the absolute amount or number of a molecule or constituent, but rather to the nature of the constituent. "At least one gelling agent" therefore means, for example, that at least one type of gelling agent is present, but even two or more different types of gelling agents may be contained. "At least one" does not refer to the amount of gelling agent molecules present in the composition.

On the contrary, unless explicitly stated otherwise, quantities are based on the total amount of all gelling agents in the composition.

Numbers given herein without decimal places relate to the full given value to one decimal place. For example, "99%" stands for "99.0%."

The term "approximately" or "about" in conjunction with a numerical value relates to a variance of ±10% based on the given numerical value, preferably ±5%, particularly preferably ±1%.

Unless indicated otherwise, all percentages are indicated in percentage by weight (wt. %). Numerical ranges that are given in the format "x to y" include the cited values "x" and "y." If several preferred numerical ranges are indicated in this format, it is self-evident that all ranges that result from the combination of the various endpoints are also included.

"Water soluble" as used herein means a solubility in water at 20° C. of at least 1 g/L, preferably at least 10 g/L, more preferably at least 50 g/L.

"Liquid" as used herein means that a compound is "liquid" or "flowable" under conditions of use, preferably at 20° C. and atmospheric pressure.

The term "fragrance" is a synonym for a "fragrance compound," a "scent," a "scent compound," a "perfume" or a "perfume compound." A "fragrance" may refer to a single compound or to a mixture of different compounds. These compounds can include both free fragrance compounds and encapsulated fragrance compounds. In the context of this application, the term "perfume oil" preferably refers to a mixture of free perfume compounds, more preferably natural perfume compounds, even more preferably those of plant origin.

These and other aspects, embodiments, features and advantages of the invention will become apparent to a person skilled in the art through the study of the following detailed description and claims. Any feature from one embodiment of the invention can be used in any other embodiment of the invention. Furthermore, it is self evident that the examples contained herein are intended to describe and illustrate, but not limit, the invention and that, in particular, the invention is not limited to these examples.

DETAILED DESCRIPTION OF THE INVENTION

The substantive matter, subjects and embodiments presented below, which are described for the fragranced shaped body according to the invention, are also transferable to the washing or cleaning agent according to the invention, the method for producing the fragranced shaped body according to the invention and the use of the fragranced shaped body according to the invention, and vice versa.

According to the invention, the fragranced shaped body comprises or consists of a composition which is obtained by bringing the following components into contact:

(a) at least one gelling agent having a molar mass <2000 g/mol, and (b) at least one fragrance.

In a preferred embodiment, the gelling agent has a molar mass of <1000 g/mol.

In a preferred embodiment, the gelling agent has a solubility in water of less than 0.1 g/L (20° C.). The solubility of the organic gelator compound is determined at 20° C. in bidistilled, demineralized water.

Furthermore, preferably suitable gelling agents are those which have a structure containing at least one hydrocarbon structural unit, having 6 to 20 carbon atoms (preferably at least one carbocyclic aromatic structural unit), and additionally an organic structural unit, covalently bonded to the aforementioned hydrocarbon unit, which comprise at least two groups selected from —OH, —NH— or mixtures thereof.

In a particularly preferred embodiment, the at least one gelling agent is selected from the group consisting of benzylidene alditol compound, hydroxystearic acid, hydrogenated castor oil, diarylamidocystine compound, N—($C_8$-$C_{24}$)-hydrocarbyl glyconamide, diketopiperazine compound, 2-methylacrylic acid-2-ureido-ethyl ester and mixtures thereof. More preferably, the at least one gelling agent is dibenzylidene sorbitol (DBS).

Particularly preferred fragranced shaped bodies are characterized in that said fragranced shaped bodies contain at least one benzylidene alditol compound of the formula (GB-I) as gelling agent (GB-I)

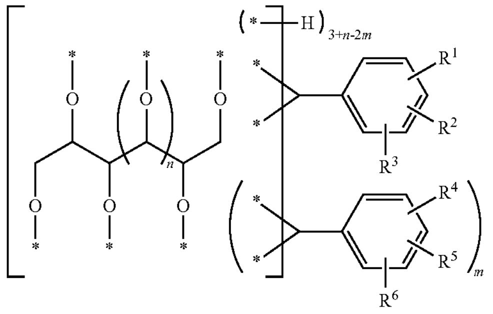

in which

*- represents a covalent single bond between an oxygen atom of the alditol backbone and the provided functional group, n represents 0 or 1, preferably 1, m represents 0 or 1, preferably 1, $R^1$, $R^2$ and $R^3$ independently of one another represent a hydrogen atom, a halogen atom, a $C_1$-$C_4$ alkyl group, a cyano group, a nitro group, an amino group, a carboxyl group, a hydroxyl group, a —C(=O)—NH—$NH_2$ group, a —NH—C(=O)—($C_2$-$C_4$-alkyl) group, a $C_1$-$C_4$ alkoxy group, a $C_1$-$C_4$ alkoxy $C_2$-$C_4$ alkyl group, with two of the functional groups forming, together with the remainder of the molecule, a 5-membered or 6-membered ring, $R^4$, $R^5$ and $R^6$ independently of one another represent a hydrogen atom, a halogen atom, a $C_1$-$C_4$ alkyl group, a cyano group, a nitro group, an amino group, a carboxyl group, a hydroxyl group, a —C(=O)—NH—$NH_2$ group, a —NH—C(=O)—($C_2$-$C_4$-alkyl) group, a $C_1$-$C_4$ alkoxy group, a $C_1$-$C_4$ alkoxy $C_2$-$C_4$ alkyl group, with two of the functional groups forming, together with the remainder of the molecule, a 5-membered or 6-membered ring.

Owing to the stereochemistry of the alditols, it should be mentioned that benzylidene alditols according to the invention and as described above are suitable in the L configuration or in the D configuration or a mixture of the two. Owing to natural availability, the benzylidene alditol compounds are preferably used according to the invention in the D configuration. It has been found to be preferable for the alditol backbone of the benzylidene alditol compound according to formula (GB-I) contained in the fragranced shaped body to be derived from D-glucitol, D-mannitol, D-arabinitol, D-ribitol, D-xylitol, L-glucitol, L-mannitol, L-arabinitol, L-ribitol, or L-xylitol.

Particularly preferred are those fragranced shaped bodies which are characterized in that $R^1$, $R^2$, $R^3$, $R^4$, $R^5$ and $R^6$ according to the benzylidene alditol compound of formula (GB-I) mean, independently of one another, a hydrogen atom, methyl, ethyl, chlorine, fluorine, or methoxy, preferably a hydrogen atom.

n according to benzylidene alditol compound of formula (GB-I) preferably represents 1.

m according to benzylidene alditol compound formula (GB-I) preferably represents 1.

The fragranced shaped body according to the invention very particularly preferably contains, as benzylidene alditol compound of the formula (GB-I), at least one compound of the formula (GB-I1)

(GB-I1)

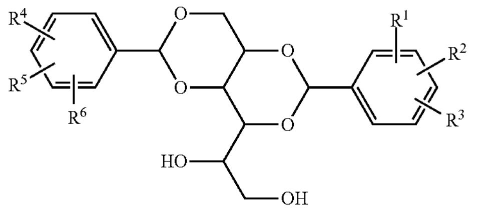

where $R^1$, $R^2$, $R^3$, $R^4$, $R^5$ and $R^6$ are as defined in formula (I). Most preferably, according to formula (GB-I1), $R^1$, $R^2$, $R^3$, $R^4$, $R^5$ and $R^6$ represent, independently of one another, a hydrogen atom, methyl, ethyl, chlorine, fluorine, or methoxy, preferably a hydrogen atom.

Most preferably, the benzylidene alditol compound of formula (GB-I) is selected from 1,3:2,4-di-O-benzylidene-D-sorbitol; 1,3:2,4-di-O-(p-methylbenzylidene)-D-sorbitol; 1,3:2,4-di-O-(p-chlorobenzylidene)-D-sorbitol; 1,3:2,4-di-O-(2,4-dimethylbenzylidene)-D-sorbitol; 1,3:2,4-di-O-(p-ethylbenzylidene)-D-sorbitol; 1,3:2,4-di-O-(3,4-dimethylbenzylidene)-D-sorbitol or mixtures thereof.

Preferred fragranced shaped bodies contain as gelling agent at least one 2,5-diketopiperazine compound of the formula (GB-II)

(GB-II)

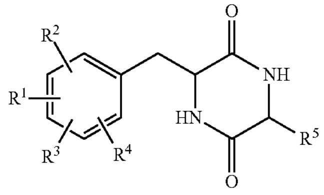

in which $R^1$, $R^2$, $R^3$ and $R^4$ represent, independently of one another, a hydrogen atom, a hydroxyl group, a $(C_1$-$C_6)$ alkyl group, a $(C_2$-$C_6)$ alkenyl group, a $(C_2$-$C_6)$ acyl group, a $(C_2$-$C_6)$ acyloxy group, a $(C_1$-$C_6)$ alkoxy group, an amino group, a $(C_2$-$C_6)$ acylamino group, a $(C_1$-$C_6)$ alkylaminocarbonyl group, an aryl group, an aroyl group, an aroyloxy group, an aryloxy group, an aryl $(C_1$-$C_4)$ alkyloxy group, an aryl $(C_1$-$C_3)$ alkyl group, a heteroaryl group, a heteroaryl $(C_1$-$C_3)$ alkyl group, a $(C_1$-$C_4)$ hydroxyalkyl group, a $(C_1$-$C_4)$ aminoalkyl group, a carboxy $(C_1$-$C_3)$ alkyl group, wherein at least two of the functional groups $R^1$ to $R^4$ together with the remainder of the molecule can form a 5 or 6-membered ring, $R^5$ represents a hydrogen atom, a linear ($C_1$ to $C_6$) alkyl group, a branched ($C_3$ to $C_{10}$) alkyl group, a ($C_3$ to $C_6$) cycloalkyl group, a $(C_2$-$C_6)$ alkenyl group, a $(C_2$-$C_6)$ alkinyl group, a $(C_1$-$C_4)$ hydroxyalkyl group, a $(C_1$-$C_4)$ alkoxy $(C_1$-$C_4)$ alkyl group, a $(C_1$-$C_4)$ acyloxy $(C_1$-$C_4)$ alkyl group, an aryloxy $(C_1$-$C_4)$ alkyl group, an O-(aryl-$(C_1$-$C_4)$-alkyl) oxy $(C_1$-$C_4)$ alkyl group, a $(C_1$-$C_4)$-alkylsulfanyl-$(C_1$-$C_4)$-alkyl group, an aryl group, an aryl-$(C_1$-$C_3)$-alkyl group, a heteroaryl group, a heteroaryl-$(C_1$-$C_3)$-alkyl group, a $(C_1$-$C_4)$-hydroxyalkyl group, a $(C_1$-$C_4)$-aminoalkyl group, a N—$(C_1$-$C_4)$-alkylamino-$(C_1$-$C_4)$-alkyl group, a N,N—$(C_1$-$C_4)$-dialkylamino-$(C_1$-$C_4)$-alkyl group, a N—$(C_2$-$C_8)$-acylamino-$(C_1$-$C_4)$-alkyl group, a N—$(C_2$-$C_8)$-acyl-N—$(C_1$-$C_4)$-alkylamino-$(C_1$-$C_4)$-alkyl group, a N—$(C_2$-$C_8)$-aroyl-N—$(C_1$-$C_4)$-alkylamino-$(C_1$-$C_4)$-alkyl group, a N,N—$(C_2$-$C_8)$-diacylamino-$(C_1$-$C_4)$-alkyl group, a N-(aryl-$(C_1$-$C_4)$-alkyl)amino-$(C_1$-$C_4)$-alkyl group, a N,N-di(aryl-$(C_1$-$C_4)$-alkyl)amino-$(C_1$-$C_4)$-alkyl group, a $(C_1$-$C_4)$-carboxyalkyl group, a $(C_1$-$C_4)$-alkoxycarbonyl-$(C_1$-$C_3)$-alkyl group, a $(C_1$-$C_4)$-acyloxy-$(C_1$-$C_3)$-alkyl group, a guanidino-$(C_1$-$C_3)$-alkyl group, an aminocarbonyl-$(C_1$-$C_4)$-alkyl group, a N—$(C_1$-$C_4)$-alkylaminocarbonyl-$(C_1$-$C_4)$-alkyl group, a N,N-di($(C_1$-$C_4)$-alkyl)aminocarbonyl-$(C_1$-$C_4)$-alkyl group, a N—$(C_2$-$C_8)$-acylaminocarbonyl-$(C_1$-$C_4)$-alkyl group, a N,N—$(C_2$-$C_8)$-diacylaminocarbonyl-$(C_1$-$C_4)$-alkyl group, a N—$(C_2$-$C_8)$-acyl-N—$(C_1$-$C_4)$-alkylaminocarbonyl-$(C_1$-$C_4)$-alkyl group, a N-(aryl-$(C_1$-$C_4)$-alkyl)aminocarbonyl-$(C_1$-$C_4)$-alkyl group, a N-(aryl-$(C_1$-$C_4)$-alkyl)-N—$(C_1$-$C_6)$-alkylaminocarbonyl-$(C_1$-$C_4)$-alkyl group or a N,N-di(aryl-$(C_1$-$C_4)$-alkyl)aminocarbonyl-$(C_1$-$C_4)$-alkyl group.

It is preferred according to the invention for $R^3$ and $R^4$ according to formula (GB-II) to represent a hydrogen atom. It is particularly preferred according to the invention for $R^2$, $R^3$ and $R^4$ according to formula (GB-II) to represent a hydrogen atom. Therefore, very particularly preferred fragranced shaped bodies according to the invention contain at least one 2,5-diketopiperazine compound according to formula (GB-IIa)

(GB-IIa)

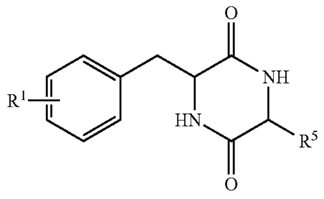

in which $R^1$ and $R^5$ are as defined under formula (GB-II) (vide supra).

It has been found to be preferable for the functional group $R^1$ according to formula (GB-II) and according to formula (GB-IIa) to bond in the para position of the phenyl ring. In the context of the present invention, fragranced shaped bodies according to the invention which contain at least one 2,5-diketopiperazine compound of the formula (GB-IIb) are therefore preferred.

(GB-IIb)

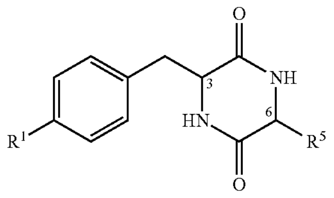

in which $R^1$ and $R^5$ are as previously defined under formula (GB-II) (vide supra). The numbers 3 and 6 positioned on the ring atoms in formula (GB-IIb) are merely for illustrating positions 3 and 6 of the diketopiperazine ring, as generally used within the scope of the invention for naming all the 2,5-diketopiperazines according to the invention.

The 2,5-diketopiperazine compounds of the formula (GB-II) have chirality centers at least at the carbon atoms of positions 3 and 6 of the 2,5-diketopiperazine ring. The numbering of ring positions 3 and 6 was illustrated in formula (GB-IIb) by way of example. The 2,5-diketopiperazine compound of the formula (GB-II) of the compositions according to the invention is preferably based on the stereochemistry of the carbon atoms at positions 3 and 6 of the 2,5-Diketopiperazinringes, the configuration isomers 3S,6S, 3R,6S, 3S,6R, 3R,6R or mixtures thereof, particularly preferably 3S,6S.

Preferred fragranced shaped bodies contain at least one 2,5-diketopiperazine compound of the formula (GB-II) as a gelling agent selected from 3-benzyl-6-carboxyethyl-2,5-diketopiperazine, 3-benzyl-6-carboxymethyl-2,5-diketopiperazine, 3-benzyl-6-(p-hydroxybenzyl)-2,5-diketopiperazine, 3-benzyl-6-isopropyl-2,5-diketopiperazine, 3-benzyl-6-(4-aminobutyl)-2,5-diketopiperazine, 3,6-di(benzyl)-2,5-diketopiperazine, 3,6-di(p-hydroxybenzyl)-2,5-diketopiperazine, 3,6-di(p-(benzyloxy)benzyl)-2,5-diketopiperazine, 3-benzyl-6-(4-imidazolyl)methyl-2,5-diketopiperazine, 3-benzyl-6-methyl-2,5-diketopiperazine, 3-benzyl-6-(2-(benzyloxycarbonyl)ethyl)-2,5-diketopiperazine or mixtures thereof. In turn, compounds having the aforementioned configuration isomers are preferably suitable for selection.

It is also possible for the fragranced shaped bodies according to the invention to contain as gelling agent at least one diarylamidocystine compound of the formula (GB-III)

(GB-III)

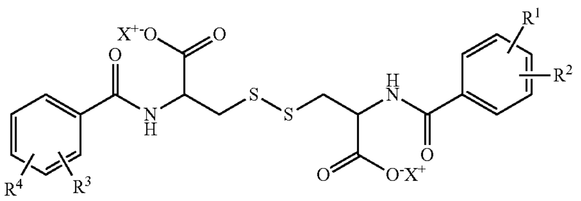

in which $X^+$, independently of each other, stands for a hydrogen atom or an equivalent of a cation, $R^1$, $R^2$, $R^3$, and $R^4$, independently of each other, can be substituted for a hydrogen atom, a halogen atom, a $C_1$-$C_4$ alkyl group, a $C_1$-$C_4$ alkoxy group, a $C_2$-$C_4$ hydroxyalkyl group, a hydroxyl group, an amino group, a N—($C_1$-$C_4$ alkyl)amino group, a N,N-di($C_1$-$C_4$ alkyl)amino group, a N—($C_2$-$C_4$ hydroxyalkyl)amino group, a N,N-di($C_2$-$C_4$ hydroxyalkyl)amino group, or $R^1$ with $R^2$ or $R^3$ with $R^4$ forms a 5- or 6-member annulated ring, which in turn can each be substituted with at least one group from $C_1$-$C_4$ alkyl group, $C_1$-$C_4$ alkoxy group, $C_2$-$C_4$ hydroxyalkyl group, hydroxyl group, amino group, N—($C_1$-$C_4$ alkyl)amino group, N,N-di($C_1$-$C_4$ alkyl)amino group, N—($C_2$-$C_4$ hydroxyalkyl)amino group, N,N-di($C_2$-$C_4$ hydroxyalkyl) amino group.

Each of the stereocenters contained in the compound of formula (GB-III) may independently represent the L or D stereoisomer. It is preferable according to the invention for said cystine compound of formula (GB-III) to be derived from the L stereoisomer of the cysteine.

The above-mentioned fragranced shaped bodies can contain at least one compound of formula (GB-III), in which $R^1$, $R^2$, $R^3$, and $R^4$, independently of each other, represent a hydrogen atom, a halogen atom, a $C_1$-$C_4$ alkyl group, a $C_1$-$C_4$ alkoxy group, a $C_2$-$C_4$ hydroxyalkyl group, a hydroxyl group, or $R^1$ with $R^2$ or $R^3$ with $R^4$ forms a 5- or 6-member annulated ring, which in turn can each be substituted with at least one group from $C_1$-$C_4$ alkyl group, $C_1$-$C_4$ alkoxy group, $C_2$-$C_4$ hydroxyalkyl group, or hydroxyl group. Particularly suitable fragranced shaped bodies are those which contain N,N'-dibenzoylcystine ($R^1$=$R^2$=$R^3$=$R^4$=hydrogen atom; X+=independently of one another for hydrogen atom or equivalent of a cation), in particular N,N'-dibenzoyl-L-cystine, as diarylamidocystine compounds of the formula (GB-III).

The N—($C_8$-$C_{24}$) hydrocarbylglyconamide compounds suitable as gelling agents preferably have the formula (GB-IV)

(GB-IV)

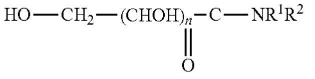

wherein n is 2 to 4, preferably 3 or 4, in particular 4;

$R^1$ is selected from hydrogen, $C_1$-$C_{16}$ alkyl functional groups, $C_1$-$C_3$ hydroxy or methoxyalkyl functional groups, preferably $C_1$-$C_3$ alkyl, hydroxyalkyl or methoxyalkyl functional groups, particularly preferably methyl;

$R^2$ is selected from $C_8$-$C_{24}$ alkyl functional groups, $C_8$-$C_{24}$ monoalkenyl functional groups, $C_8$-$C_{24}$ dialkenyl functional groups, $C_8$-$C_{24}$ trialkenyl functional groups, $C_8$-$C_{24}$ hydroxyalkyl functional groups, $C_8$-$C_{24}$ hydroxyalkenyl functional groups, $C_1$-$C_3$ hydroxyalkyl functional groups or methoxy $C_1$-$C_3$ alkyl functional groups, preferably $C_8$-$C_{18}$ alkyl functional groups and mixtures thereof, more preferably $C_8$, $C_{10}$, $C_{12}$, $C_{14}$, $C_{16}$ and $C_{18}$ alkyl functional groups and mixtures thereof, most preferably $C_{12}$ and $C_{14}$ alkyl functional groups or a mixture thereof.

In particularly preferred embodiments, the functional group

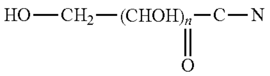

is a functional group derived from glycuronic acid, in particular the glycuronic acid of a hexose (n=4). Glucuronic acid should be mentioned in particular here as a preferred functional group.

$R^1$ is preferably H or a short-chain alkyl functional group, in particular methyl.

$R^2$ is preferably a long-chain alkyl functional group, for example, a $C_8$-$C_{18}$ alkyl functional group.

Very particular preference is therefore given to compounds of formula (GB-IV1)

(GB-IV1)

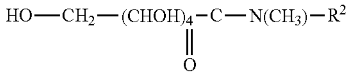

wherein $R^2$ has the meanings given for formula (GB-IV).

In preferred embodiments, the at least one gelling agent, selected from the group consisting of dibenzylidenesorbitol or derivatives thereof, hydroxystearic acid, hydrogenated castor oil, dibenzoylcystine or derivatives thereof, N-octyl-gluconamide, diketopiperazine compounds, 2-methylacrylate-ureido-ethylester or mixtures thereof, is contained in an amount of 0.01 to 20 wt. %, more preferably 0.5 to 10 wt. %, even more preferably 1 to 10 wt. %, most preferably 3 to 8 wt. %, based on the total weight of the composition. In particular, dibenzylidenesorbitol is contained in the composition in an amount of 0.01 to 20 wt. %, more preferably 1 to 10 wt. %.

In a preferred embodiment, at least one solvent (c), preferably an alcohol having at least one OH group, more preferably at least two OH groups, is contained in the fragranced shaped body according to the invention together with the at least one gelling agent. In a preferred embodiment, the composition contains at least one solvent (c), preferably an alcohol having at least one OH group, more preferably at least two OH groups.

In preferred embodiments, the at least one solvent (c) is contained in an amount of 0.01 to 95 wt. %, preferably 70 to 95 wt. %, based on the total weight of the composition.

Suitable solvents are alcohols having an OH group, preferably selected from methanol, ethanol, 1-propanol, 2-propanol, 1-butanol, tert-butanol, glycerol carbonate and mixtures thereof.

Preferred alcohols having two OH groups which can be used as solvents are ethylene glycol, triethylene glycol, 1,2-propanediol, dipropylene glycol, glycerol, 3-methoxy-3-methyl-1-butanol and mixtures thereof.

In preferred embodiments, the solvent (c) is selected from the group consisting of glycerol carbonate, glycerol, triethylene glycol, and mixtures thereof.

In a preferred embodiment, a mixture of glycerol carbonate and glycerol is used as the solvent (c). Preferably, a 50:50 mixture of glycerol carbonate and glycerol is used. More preferably, the two solvents are each used in an amount of 0.01 to 47.5 wt. %, even more preferably 10 to 45 wt. %.

In a further preferred embodiment, the solvents glycerol carbonate and glycerol are used in a total amount of 0.01 to 95 wt. %, preferably 70 to 90 wt. %.

In another preferred embodiment, triethylene glycol is used as the solvent (c). In these embodiments, the solvent is contained in amounts of 0.01 to 95 wt. %, preferably in amounts of 70 to 95 wt. %, based on the total weight of the composition.

According to the invention, the composition of the fragranced shaped body contains at least one fragrance (b).

This fragrance is preferably selected from free, non-encapsulated perfume compounds, such as perfume oils, fragrance capsules, and mixtures of both.

Furthermore, the fragrance may be a pro-fragrance or fragrance precursor which preferably releases or responds to a perfume compound during the washing or cleaning process. The conversion or cleavage of the fragrance precursor can be carried out, for example, by the action of water, air, light, temperature, pH, pressure or friction. The fragrance precursors or pro-fragrances can be present both as free fragrance precursors or in the form of fragrance capsules.

In a preferred embodiment, the fragrance capsules are microcapsules. The microcapsules may store or include one or more fragrances. The capsules are preferably stable within the fragranced shaped body or as a constituent of a washing or cleaning agent and can be opened by targeted stimulus, in particular the application of mechanical force. In the context of the present invention, "the application of mechanical force" is understood to mean any type of force applied to the microcapsule, such as shearing forces, pressure and/or friction. When using the fragranced shaped body, for example when washing textiles, the microcapsules are deposited on the soft surface or the textile or the hard surfaces and can be easily opened after drying the surface, for example by friction. This approach results in targeted release of the fragrance.

The microcapsules preferably have an average diameter of 1 to 1000 μm. In the context of the present invention, the term microcapsule also includes nanocapsules; i.e. capsules having a diameter <1 μm. The capsules preferably have an average diameter of 0.1 to 100 μm. The wall thickness of the microcapsules may be, for example, 0.05 to 10 μm.

The fragrance capsules can be used in the form of a capsule slurry or in anhydrous form. The fragrance capsules are preferably in the form of a capsule slurry. A capsule slurry is a mixture of microcapsules and a solvent, preferably water, whereby the microcapsules are preferably slurried.

The microcapsules may be water-soluble and/or water-insoluble microcapsules. For example, melamine-urea-formaldehyde microcapsules, melamine-formaldehyde microcapsules, urea-formaldehyde microcapsules or starch microcapsules can be used.

The proportion of free fragrance or free perfume compounds in the composition according to the invention is preferably 0.1 to 20 wt. %, more preferably 1 to 10 wt. %, most preferably 4 to 7 wt. %, based on the total weight of the composition. A single free perfume compound or a mixture of different free compounds may be used.

In this case, "free" refers to "non-encapsulated" perfume compounds.

The fragrance may also be added to aqueous fragrance solutions in order to form the composition of the fragranced shaped body according to the invention.

When fragrance capsules are used, they are preferably contained in amounts of 0.1 to 20 wt. %, more preferably 1 to 10 wt. %, most preferably 4 to 7 wt. %, based on the total weight of the composition.

The fragrance capsules are preferably present in a capsule slurry, more preferably in a slurry containing 30 to 80 wt. % microcapsules, even more preferably in a slurry containing 40 to 60 wt. % microcapsules, most preferably in a slurry containing 50 wt. % microcapsules, based on the total weight of the capsule slurry.

In a preferred embodiment, the capsule slurry has a water content of 20 to 70 wt. %, more preferably 40 to 60 wt. %, most preferably 50 wt. %, based on the total weight of the capsule slurry.

In a further preferred embodiment, the capsule slurry consists only of water and microcapsules, which contain a fragrance or a mixture of fragrances. However, the capsule slurry may also contain other ingredients or solvents known to a person skilled in the art.

In a preferred embodiment, there is a mixture of at least one free perfume compound or a mixture of free perfume compounds and at least one type of fragrance capsule. If both free perfume compounds and fragrance capsules, which are preferably in the form of a capsule slurry, are contained, the composition contains fragrances in a total amount of 0.1 to 20 wt. %, more preferably 1 to 18 wt. %, the most preferably 4 to 14 wt. %.

Suitable fragrances are individual fragrance compounds, for example of the ester, ether, aldehyde, ketone, alcohol and hydrocarbon types.

Fragrance compounds of the aldehyde type are, for example, Adoxal (2,6,10-trimethyl-9-undecenal), anisaldehyde (4-methoxybenzaldehyde), cymene (3-(4-isopropyl-phenyl)-2-methylpropanal), ethylvanillin, Florhydral (3-(3-isopropylphenyl)butanal), Helional (3-(3,4-methylenedioxyphenyl)-2-methylpropanal), heliotropin, hydroxycitronellal, lauraldehyde, Lyral (3- and 4-(4-hydroxy-4-methylpentyl)-3-cyclohexene-1-carboxaldehyde), methylnonylacetaldehyde, Lilial (3-(4-tert-butylphenyl)-2-methylpropanal), phenylacetaldehyde, undecylenealdehyde, vanillin, 2,6,10-trimethyl-9-undecenal, 3-dodecen-1-al, alpha-n-amylcinnamaldehyde, melonal (2,6-dimethyl-5-heptenal), 2,4-di-methyl-3-cyclohexene-1-carboxaldehyde (Triplal), 4-methoxybenzaldehyde, benzaldehyde, 3-(4-tert-butylphenyl)-propanal, 2-methyl-3-(para-methoxyphenyl) propanal, 2-methyl-4-(2,6,6-timethyl-2(1)-cyclohexen-1-yl) butanal, 3-phenyl-2-propenal, cis-/trans-3,7-dimethyl-2,6-octadien-1-al, 3,7-dimethyl-6-octen-1-al, [(3,7-dimethyl-6-octenyl)oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]-decylidene-8)-butanal, octahydro-4,7-methane-1H-indenecarboxaldehyde, 3-ethoxy-4-hydroxybenzaldehyde, para-ethyl-alpha, alpha-dimethylhydrocinnamaldehyde, alpha-methyl-3,4-(methylenedioxy)-hydrocinnamaldehyde, 3,4-methylenedioxybenzaldehyde, alpha-n-hexylcinnamaldehyde, m-cymene-7-carboxaldehyde, alpha-methylphenylacetaldehyde, 7-hydroxy-3,7-dimethyloctanal, undecenal, 2,4,6-trimethyl-3-cyclohexene-1-carboxaldehyde, 4-(3)(4-methyl-3-pentenyl)-3-cyclohexene carboxaldehyde, 1-dodecanal, 2,4-dimethylcyclohexene-3-carboxaldehyde, 4-(4-hydroxy-4-methylpentyl)-3-cyclohexene-1-carboxaldehyde, 7-methoxy-3,7-dimethyloctan-1-al, 2-methyl-undecanal, 2-methyldecanal, 1-nonanal, 1-octanal, 2,6,10-trimethyl-5,9-undecadienal, 2-methyl-3-(4-tert-butyl)propanal, dihydrocinnamaldehyde, 1-methyl-4-(4-methyl-3-pentenyl)-3-cyclohexene-1-carboxaldehyde, 5- or 6-methoxyhexahydro-4,7-methanindan-1- or 2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3J-dimethyl-octanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexene-carboxaldehyde, 3J-dimethyl-2-methylene-6-octenal, phenoxyacetaldehyde, 5,9-dimethyl-4,8-decadienal, peonyaldehyde (6,10-dimethyl-3-oxa-5,9-undecadien-1-al), hexahydro-4,7-methanindan-1-carboxaldehyde, 2-methyloctanal, alpha-methyl-4-(1-methylethyl)benzeneacetaldehyde, 6,6-dimethyl-2-norpinene-2-propionaldehyde, para-methylphenoxyacetaldehyde, 2-methyl-3-phenyl-2-propen-1-al, 3,5,5-trimethylhexanal, hexahydro-8,8-dimethyl-2-naphthaldehyde, 3-propyl-bicyclo-[2.2.1]-hept-5-ene-2-carbaldehyde, 9-decenal, 3-methyl-5-phenyl-1-pentanal, methylnonylacetaldehyde, hexanal and trans-2-hexenal.

Fragrance compounds of the ketone type are, for example, methyl-beta-naphthyl ketone, musk indanone (1,2,3,5,6,7-hexahydro-1,1,2,3,3-pentamethyl-4H-inden-4-one), tonalide (6-acetyl-1,1,2,4,4,7-hexamethyltetralin), alpha-damascone, beta-damascone, delta-damascone, iso-damascone, damascenone, methyl dihydrojasmonate, menthone, carvone, camphor, Koavone (3,4,5,6,6-pentamethylhept-3-en-2-one), fenchone, alpha-ionone, beta-ionone, gamma-methyl-ionone, fleuramone (2-heptylcyclopentanone), dihydrojasmone, cis-jasmone, Iso E Super (1-(1,2,3,4,5,6J,8-octahydro-2,3,8,8-tetramethyl-2-naphthalenyl)-ethan-1-one (and isomers)), methyl cedrenyl ketone, acetophenone, methyl acetophenone, para-methoxy acetophenone, methyl beta-naphthyl ketone, benzyl acetone, benzophenone, para-hydroxyphenyl butanone, celery ketone (3-methyl-5-propyl-2-cyclohexenone), 6-isopropyldecahydro-2-naphthone, dimethyloctenone, Frescomenthe (2-butan-2-yl-cyclohexan-1-one), 4-(1-ethoxyvinyl)-3,3,5,5-tetramethylcyclohexanone, methylheptenone, 2-(2-(4-methyl)-3-cyclohexen-1-yl)propyl)cyclopentanone, 1-(p-menthen-6(2)-yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H)-indanone, 4-damascol, Dulcinyl (4-(1,3-benzodioxol-5-yl)butan-2-one), Hexalone (1-(2,6,6-trimethyl-2-cyclohexen-1-yl)-1,6-heptadien-3-one), Isocyclemone E (2-acetonaphthone-1,2,3,4,5,6,7,8-octahydro-2,3,8,8-tetramethyl), methyl nonylketone, methylcyclocitrone, methyl lavender ketone, Orivone (4-tert-amyl-cyclohexanone), 4-tert-butylcyclohexanone, Delphone (2-pentyl-cyclopentanone), muscone (CAS 541-91-3), Neobutenone (1-(5,5-dimethyl-1-cyclohexenyl)pent-4-en-1-one), Plicatone (CAS 41724-19-0), Veloutone (2,2,5-trimethyl-5-pentylcyclopentan-1-one), 2,4,4,7-tetramethyl-oct-6-en-3-one and tetramerane (6,10-dimethylundecen-2-one).

Fragrance compounds of the alcohol type are, for example, 10-undecen-1-ol, 2,6-dimethylheptan-2-ol, 2-methylbutanol, 2-methylpentanol, 2-phenoxyethanol, 2-phenylpropanol, 2-tert-butycyclohexanol, 3,5,5-trimethyl-cyclohexanol, 3-hexanol, 3-methyl-5-phenyl-pentanol, 3-octanol, 3-phenyl-propanol, 4-heptenol, 4-isopropylcyclohexanol, 4-tert-butycyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, β-terpineol, butyl salicylate, citronellol, cyclohexyl salicylate, decanol, di-hydromyrcenol, dimethylbenzylcarbinol, dimethylheptanol, dimethyloctanol, ethylsalicylate, ethylvanillin, eugenol, farnesol, geraniol, heptanol, hexylsalicylate, isoborneol, isoeugenol, isopulegol, linalool, menthol, myrtenol, n-hexanol, nerol, nonanol, octanol, p-menthan-7-ol, phenylethyl alcohol, phenol, phenyl salicylate, tetrahydrogeraniol, tetrahydrolinalool, thymol, trans-2-cis-6-nonadicnol, trans-2-nonen-1-ol, trans-2-octenol, undecanol, vanillin, champiniol, hexenol and cinnamyl alcohol.

Fragrance compounds of the ester type are, for example, benzyl acetate, phenoxyethyl isobutyrate, p-tert-butylcyclohexyl acetate, linalyl acetate, dimethylbenzylcarbinyl acetate (DMBCA), phenylethyl acetate, benzyl acetate, ethylmethylphenyl glycinate, allylcyclohexyl propionate, styrallyl propionate, benzyl salicylate, cyclohexyl salicylate, floramate, melusate, and jasmacyclate.

Ethers include, for example, benzyl ethyl ether and Ambroxan. Hydrocarbons mainly include terpenes such as limonene and pinene.

Mixtures of fragrances, also referred to as perfume oil, may also contain natural fragrance mixtures, such as those obtainable from plant sources.

Fragrances of plant origin include essential oils, such as angelica root oil, aniseed oil, arnica blossom oil, basil oil, bay oil, champaca blossom oil, citrus oil, abies alba oil, abies alba cone oil, elemi oil, eucalyptus oil, fennel oil, spruce needle oil, galbanum oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, cananga oil, cardamom oil, cassia oil, pine needle oil, copaiba balsam oil, coriander oil, spearmint oil, caraway oil, cumin oil, labdanum oil, lavender oil, lemon grass oil, lime blossom oil, lime oil, mandarin oil, melissa oil, mint oil, musk seed oil, muscatel oil, myrrh oil, clove oil, neroli oil, niaouli oil, olibanum oil, orange blossom oil, orange peel oil, oregano oil, palmarosa oil, patchouli oil, balsam of Peru oil, petitgrain oil, pepper oil, peppermint oil, allspice oil, pine oil, rose oil, rosemary oil, sage oil, sandalwood oil, celery oil, spike lavender oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil and cypress oil, and ambrettolide, Ambroxan, alpha-amylcinnamaldehyde, anethole, anisaldehyde, anise alcohol, anisole, anthranilic acid methyl ester, acetophenone, benzylacetone, benzaldehyde, benzoic acid ethyl ester, benzophenone, benzyl alcohol, benzyl acetate, benzyl benzoate, benzyl formate, benzyl valerianate, borneol, bornyl acetate, boisambrene forte, alpha-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptyne carboxylic acid methyl ester, heptaldehyde, hydroquinone dimethyl ether, hydroxycinnamaldehyde, hydroxycinnamyl alcohol, indole, irone, isoeugenol, isoeugenol methyl ether, isosafrole, jasmine, camphor, carvacrol, carvone, p-cresol methyl ether, coumarin, p-methoxyacetophenone, methyl n-amyl ketone, methylanthranilic acid methyl ester, p-methylacetophenone, methylchavicol, p-methylquinoline, methyl beta-naphthyl ketone, methyl n-nonylacetaldehyde, methyl n-nonyl ketone, muscone, beta-naphthol ethyl ether, beta-naphthol methyl ether, nerol, n-nonylaldehyde, nonyl alcohol, n-octylaldehyde, p-oxy-acetophenone, pentadecanolide, beta-phenethyl alcohol, phenylacetic acid, pulegone, safrole, salicylic acid isoamyl ester, salicylic acid methyl ester, salicylic acid hexyl ester, salicylic acid cyclohexyl ester, santalol, sandelice, skatole, terpineol, thyme, thymol, Troenan, gamma-undecalactone, vanillin, veratraldehyde, cinnamaldehyde, cinnamyl alcohol, cinnamic acid, cinnamic acid ethyl ester, cinnamic acid benzyl ester, diphenyl oxide, limonene, linalool, linalyl acetate and propionate, melusate, menthol, menthone, methyl-n-heptenone, pinene, phenylacetaldehyde, terpinyl acetate, citral, citronellal and mixtures thereof.

Preferably, mixtures of different fragrances or fragrance compounds are used, which together produce a fragrance note that is appealing to the customer. In order to be able to stimulate the sense of smell, it should be possible for the chemical substance to be at least partially distributed in the air, i.e. the fragrance should be volatile at 25° C. at least to a small extent. If the fragrance is very volatile, the odor intensity abates quickly. At a lower volatility, however, the odor is longer lasting, i.e. it does not disappear as quickly. In one embodiment, the fragrance therefore has a melting point in the range of −100° C. to 100° C., preferably −80° C. to 80° C., more preferably −20° C. to 50° C., most preferably −30° C. to 20° C. In a further embodiment, the fragrance has a boiling point in the range of 25° C. to 400° C., preferably 50° C. to 380° C., more preferably 75° C. to 350° C., most preferably 100° C. to 330° C.

Overall, in order to act as a fragrance, a chemical substance should not exceed a certain molecular mass since, if the molecular mass is too high, the required volatility can no longer be ensured. In one embodiment, the fragrance has a molar mass of 40 to 700 g/mol, more preferably 60 to 400 g/mol.

The composition of the fragranced shaped body may, in different embodiments, contain at least one additive (d) suitable for adjusting desired properties of the composition. These additives, described below, can each be contained individually or in any desired combinations in the composition according to the invention. Therefore, the composition may, for example, also comprise an adsorber material for receiving a fragrance, in particular the non-encapsulated fragrance, inert fillers or auxiliary substances, surfactants, dyes, pearlescing agents, bitter principles or additional ingredients such as textile care or skin-care compounds.

Optional additives (d) of the composition according to the invention of the fragranced shaped body are explained in more detail in the following.

Water may also be contained as an additive in the composition according to the invention of the fragranced shaped body. Here, water can be introduced into the composition according to the invention additionally or as a constituent of (a) and/or (b) and/or (c).

In addition, however, water may also be contained in constituents (a) and (b) or the optional constituent (c) of the composition according to the invention of the fragranced shaped body.

In a preferred embodiment, there is a low-water composition of the fragranced shaped body, which contains 0.001 to 40 wt. % of water, based on the total weight of the composition.

In a different preferred embodiment, there is a water-rich composition of the fragranced shaped body, which contains 40 to 90 wt. % of water, based on the total weight of the composition.

In a preferred embodiment, the at least one additive is contained in the composition in an amount of 0.0001 to 40 wt. %, based on the total weight of the composition.

Suitable fillers or auxiliary substances which provide, for example, better processability or homogenization of the microcapsules or of the fragrances with the gelling agent in the composition can be selected, for example, from the list below, without being limited thereto: alkali silicates, alkali metal sulfates, preferably sodium sulfate, alkali carbonates, preferably sodium carbonate, alkali metal phosphates, cellulose and derivatives thereof, preferably microfibrillated cellulose, fatty alcohols, preferably stearyl alcohol, fatty alcohol alkoxylates, preferably C12-18 alkyl ethers having 5-8, more preferably 7EO, fatty alcohol and fatty alcohol ether sulfates, preferably C10-18 fatty alcohol (ether) sulfates, and alkylbenzene sulfonates, preferably linear C10-13 alkylbenzene sulfonates and mixtures thereof.

Fillers and auxiliary substances may preferably be contained in the composition in an amount of 0.001 to 25 wt. %, more preferably 0.001 to 20 wt. %, even more preferably 0.01 to 15 wt. %, and most preferably below 10 wt. %, based on the total weight of the composition.

In a preferred embodiment, the at least one additive is at least one dye which is preferably contained in an amount of 0.001 to 0.5 wt. %, more preferably 0.01 to 0.3 wt. %, based on the total weight of the composition.

In order to improve the appearance of the fragranced shaped bodies, they can be dyed using suitable dyes. Preferred dyes are known to the person skilled in the art and should have a high level of storage stability and insensitivity to the other ingredients of the fragranced shaped body or the washing or cleaning agent and to light and moisture. In addition, the dyes should have little to no substantivity to textile fibers so as not to stain them.

In a further preferred embodiment, the at least one additive comprises at least one textile care compound, which is preferably selected from textile-softening compounds, silicone oils, anti-redeposition agents, optical brighteners, graying inhibitors, shrinkage preventers, anti-crease agents, dye transfer inhibitors, antimicrobial active ingredients, germicides, fungicides, antioxidants, antistatic agents, ironing aids, repellants, impregnating agents, anti-swelling and anti-slip agents, UV absorbers and mixtures thereof.

The textile care compound is preferably a textile-softening compound. Very particularly preferably, the textile-softening compound is selected from polysiloxanes, textile-softening clays, cationic polymers and mixtures thereof.

The use of polysiloxanes and/or cationic polymers as a textile care compound in the composition of the fragranced shaped body is advantageous because they not only exhibit a softening effect, but also enhance the perfume impression on the laundry. The use of softening clays as a textile care compound in the composition is advantageous because they additionally have a water-softening effect and thus, for example, limescale deposits on the laundry can be prevented. To achieve optimum performance, it may be preferable for the composition to contain a combination of at least two textile care compounds.

If the composition according to the invention of the fragranced shaped body contains textile care compounds of this type, said composition will be used in particular as a washing agent/textile care agent or softener or as a constituent of an agent of this type or as constituent of a washing agent.

A polysiloxane that can preferably be used has at least the following structural unit i.

(I)

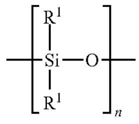

where $R^1$=independently of one another, $C_1$-$C_{30}$ alkyl, preferably $C_1$-$C_4$ alkyl, more preferably methyl or ethyl, n=1 to 5,000, preferably 10 to 2500, more preferably 100 to 1500.

It may be preferable for the polysiloxane to additionally have the following structural unit:

i.

(II)

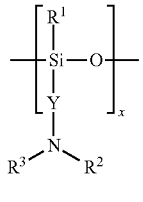

where $R^1$=$C_1$-$C_{30}$ alkyl, preferably $C_1$-$C_4$ alkyl, more preferably methyl or ethyl, Y=optionally substituted, linear or branched $C_1$-$C_{20}$ alkylene, preferably $(CH2)_m$— where m=1 to 16, preferably 1 to 8, more preferably 2 to 4, even more preferably 3, $R^2$, $R^3$=independently of one another, H or optionally substituted, linear or branched $C_1$-$C_{30}$ alkyl, preferably comprising $C_1$-$C_{30}$ alkyl substituted with amino groups, particularly preferably $—(CH_2)_b—NH_2$ where b=1 to 10, even more preferably b=2, x=1 to 5000, preferably 10 to 2500, more preferably 100 to 1500.

If the polysiloxane has only the structural unit (I) where $R^1$=methyl, it is a polydimethylsiloxane. Polydimethylpolysiloxanes are known as efficient textile care compounds.

Suitable commercially available polydimethylsiloxanes include DC-200 (ex Dow Corning), Baysilone® M 50, Baysilone® M 100, Baysilone® M 350, Baysilone® M 500, Baysilone® M 1000, Baysilone® M 1500, Baysilone® M 2000 or Baysilone® M 5000 (all ex GE Bayer Silicones).

However, it may also be preferable for the polysiloxane to contain the structural units (I) and (II). A particularly preferred polysiloxane has the following structure:

$$(CH_3)_3Si—[O—S(CH_3)_2]_n—[O—Si(CH_3)\{(CH_2)_3—NH—(CH_2)_2—NH_2\}]_x—OSi(CH_3)_3$$

where the sum n+x is a number between 2 and 10,000.

Suitable polysiloxanes having the structural units (I) and (II) are commercially available, for example, under the brand names DC2-8663, DC2-8035, DC2-8203, DC05-7022 or DC2-8566 (all ex Dow Corning). Also suitable according to the invention are, for example, the commercially available products Dow Corning® 7224, Dow Corning® 929 Cationic Emulsion or Formasil 410 (GE Silicones).

A suitable textile-softening clay is, for example, a smectite clay. Preferred smectite clays are beidellite clays, hectorite clays, laponite clays, montmorillonite clays, nontronite clays, saponite clays, sauconite clays, and mixtures thereof. Montmorillonite clays are the preferred softening clays. Bentonites contain primarily montmorillonites and may be used as a preferred source for the textile-softening clay. The bentonites may be used as powder or crystals.

Suitable bentonites are sold, for example, under the names Laundrosil® by Süd-Chemie or under the name Detercal by Laviosa. It is preferable for the textile care composition to contain a powdered bentonite as a textile care compound.

Suitable cationic polymers preferably include those described in "CTFA International Cosmetic Ingredient Dictionary," Fourth Edition, J. M. Nikitakis, et al., Editors, published by the Cosmetic, Toiletry, and Fragrance Association, 1991, and collectively referred to as "Polyquaternium." Some suitable polyquaternium compounds are listed in more detail in the following.

Polyquaternium-1 (CAS number: 68518-54-7)

Definition: $\{(HOCH_2CH_2)_3N^+—CH_2CH═CHCH_2—[N^+(CH_3)_2—CH_2CH═CHCH_2]_x—N^+(CH_2CH_2OH)_3\}[Cl^-]_{x+2}$.

Polyquaternium-2 (CAS number: 63451-27-4)

Definition: $[—N(CH_3)_2—CH_2CH_2CH_2—NH—C(O)—NH—CH_2CH_2CH_2—N(CH_3)_2—CH_2CH_2OCH_2CH_2—]^{2+}(Cl^-)_2$.

Polyquaternium-3

Definition: copolymer of acrylamide and trimethylammonium ethyl methacrylate methosulfate.

Polyquaternium-4 (CAS number: 92183-41-0)

Definition: copolymer of hydroxyethylcellulose and diallyldimethylammonium chloride.

Available for example as Celquat® H 100 or Celquat® L200 (ex National Starch).

Polyquaternium-5 (CAS number: 26006-22-4)

Definition: copolymer of acrylamide and 8-methacrylyloxyethyltrimethylammonium methosulfate.

Polyquaternium-6 (CAS number: 26062-79-3)

Definition: polymer of dimethyldiallylammonium chloride.

Polyquaternium-7 (CAS number: 26590-05-6)

Definition: polymeric quaternary ammonium salt consisting of acrylamide and dimethyldiallylammonium chloride monomers.

Polyquaternium-8

Definition: polymeric quaternary ammonium salt of methyl and stearyl dimethylaminoethyl methacrylate, which was quaternized with dimethyl sulfate.

Polyquaternium-9

Definition: polymeric quaternary ammonium salt of polydimethylaminoethyl methacrylate, which was quaternized with methyl bromide.

Polyquaternium-11 (CAS number: 53633-54-8)

Definition: quaternary ammonium polymer formed by reacting diethyl sulfate with the copolymer of vinylpyrrolidone and dimethyl aminoethyl methacrylate.

Polyquaternium-12 (CAS number: 68877-50-9)

Definition: quaternary ammonium polymer salt, obtainable by reacting the ethyl methacrylate/abietyl methacrylate/diethylaminoethyl methacrylate copolymer with dimethyl sulfate.

Polyquaternium-13 (CAS number: 68877-47-4)

Definition: polymeric quaternary ammonium salt, obtainable by reacting the ethyl methacrylate/oleyl methacrylate/diethylaminoethyl methacrylate copolymer with dimethyl sulfate.

Polyquaternium-14 (CAS number: 27103-90-8)

Definition: polymeric quaternary ammonium salt of formula $-\{-CH_2-C-(CH_3)-[C(O)O-CH_2CH_2-N(CH_3)_3-]\}_x{}^+[CH_3SO_4]^-{}_x$.

Polyquaternium-15 (CAS number: 35429-19-7)

Definition: copolymer of acrylamide and ß-methacrylyloxyethyltrimethylammonium chloride.

Polyquaternium-16 (CAS number: 95144-24-4)

Definition: polymeric quaternary ammonium salt formed from methylvinylimidazolium chloride and vinylpyrrolidone.

Polyquaternium-17 (CAS number: 90624-75-2)

Definition: polymeric quaternary ammonium salt, obtainable by reacting adipic acid and dimethylaminopropylamine with dichloroethyl ether.

Polyquaternium-18

Definition: polymeric quaternary ammonium salt, obtainable by reacting azelaic acid and dimethylaminopropylamine with dichloroethyl ether.

Polyquaternium-19

Definition: polymeric quaternary ammonium salt, obtainable by reacting polyvinyl alcohol with 2,3-epoxypropylamine.

Polyquaternium-20

Definition: polymeric quaternary ammonium salt, obtainable by reacting polyvinyl octadecyl ether with 2,3-epoxypropylamine.

Polyquaternium-21 (CAS number: 102523-94-4)

Definition: polysiloxane/polydimethyldialkylammonium acetate copolymer.

Polyquaternium-22 (CAS number: 53694-17-0)

Definition: dimethyldiallylammonium chloride/acrylic acid copolymer.

Polyquaternium-24 (CAS number: 107987-23-5)

Definition: Polymeric quaternary ammonium salt from the reaction of hydroxyethylcellulose with a lauryldimethylammonium-substituted epoxide.

Polyquaternium-27

Definition: block copolymer from the reaction of polyquaternium-2 with polyquaternium-17.

Polyquaternium-28 (CAS number: 131954-48-8)

Definition: vinylpyrrolidone/methacrylamidopropyltrimethylammonium chloride copolymer.

Polyquaternium-29

Definition: chitosan, which was reacted with propylene oxide and quaternized with epichlorohydrin.

Polyquaternium-30

Definition: polymeric quaternary ammonium salt of the formula: $-[CH_2C(CH_3)(C(O)OCH_3)]_x-[CH_2C(CH_3)(C(O)\ OCH_2CH_2N^+(CH_3)_2CH_2COO^-)]_y-$.

Polyquaternium-31 (CAS number: 136505-02-7)

Polyquaternium-32 (CAS number: 35429-19-7)

Definition: polymer of N,N,N-trimethyl-2-[(2-methyl-1-oxo-2-propenyl)oxy]-ethanaminium chloride with 2-propenamide.

Polyquaternium-37 (CAS number: 26161-33-1)

Definition: homopolymer of methacryloyltrimethyl chloride Available for example as Synthalen® CR (ex 3V Sigma).

Polyquaternium-44 (CAS number: 150595-70-5)

Definition: quaternary ammonium salt of the copolymer of vinylpyrrolidone and quaternized imidazoline.

Polyquaternium-68 (CAS number: 827346-45-2)

Definition: quaternized copolymer of vinylpyrrolidone, methacrylamide, vinylimidazole and quaternized vinylimidazole.

It may be preferable for the composition to contain a textile-softening compound and one or more other textile care compound(s).

A skin care compound is understood to mean a compound or a mixture of compounds which, upon contact of a textile with the washing agent, are absorbed by the textile and, upon contact of the textile with the skin, are beneficial to the skin in comparison with a textile which has not been treated with the composition according to the invention. This benefit may include, for example, the transfer of the skin care compound from the textile to the skin, less water transfer from the skin to the textile, or less friction on the skin surface due to the textile.

The skin care compound is preferably hydrophobic, may be liquid or solid, and must be compatible with the other ingredients. The skin care compound may include, for example, waxes such as carnauba, spermaceti, beeswax, lanolin, derivatives thereof, and mixtures thereof, plant extracts, for example vegetable oils such as avocado oil, olive oil, palm oil, palm kernel oil, rapeseed oil, linseed oil, soybean oil, peanut oil, coriander oil, castor oil, poppy seed oil, cocoa oil, coconut oil, pumpkin seed oil, wheat germ oil, sesame oil, sunflower oil, almond oil, macadamia nut oil, apricot kernel oil, hazelnut oil, jojoba oil or canola oil, chamomile, aloe vera and mixtures thereof, higher fatty acids such as lauric, myristic, palmitic, stearic, behenic, oleic, linoleic, linolenic, isostearic or polyunsaturated fatty acids; higher fatty alcohols such as lauryl alcohol, cetyl alcohol, stearyl alcohol, oleyl alcohol, behenyl alcohol or 2-hexadecanol and mixtures thereof, esters such as cetyl octanoate, lauryl lactate, myristyl lactate, cetyl lactate, isopropyl myristate, myristyl myristate, isopropyl palmitate, isopropyl adipate, butyl stearate, decyl oleate, cholesterol stearate, glycerol monostearate, glycerol distearate, glycerol tristearate, alkyl lactate, alkyl citrate or alkyl tartrate and mixtures thereof, hydrocarbons such as paraffins, mineral oils, squalane or squalene and mixtures thereof; lipids; vitamins such as vitamin A, C or E or vitamin alkyl esters and mixtures thereof, phospholipids; sunscreens such as octyl methoxyl cinnamate and butyl methoxy benzoylmethane and mixtures thereof; silicone oils such as linear or cyclic polydimethylsiloxanes, amino, alkyl, alkylaryl or aryl substituted silicone oils and mixtures thereof.

The amount of skin care compound is preferably 0.01 to 10 wt. %, more preferably 0.1 to 5 wt. %, and most preferably 0.3 to 3 wt. %, based on the total weight of the composition. It may be the case that the skincare compound additionally has a textile care effect.

In various embodiments, the fragranced shaped body may comprise one or more adsorber materials for taking up the fragrance. A corresponding adsorber material may be contained in an amount of up to 25 wt. %, based on the total weight of the composition. Preferably, the proportion is in the range of 0.001 wt. % to 25 wt. %, more preferably 0.5 wt. % to 20 wt. %, even more preferably 1 wt. % to 15 wt. %.

Suitable adsorber materials are, for example, porous inorganic substances, such as silicic acid. Organic substances such as crosslinked polymers, e.g. crosslinked polyvinylpyrrolidone, can also be used as the adsorber material.

Furthermore, the composition according to the invention of the fragranced shaped body may contain surfactants, preferably anionic surfactants.

Suitable anionic surfactants are, for example, alkyl sulfates, preferably $C_{8-12}$ alkyl sulfates, and polyalkylene glycols. These are preferably used in an amount of up to 20 wt. %, more preferably up to 10 wt. %, based on the total weight of the composition.

Examples of suitable pearlescing agents are ethylene glycol mono- and distearate and PEG-3 distearate.

To prevent oral ingestion of the fragranced shaped bodies by humans, in particular children, or animals, it may contain a bitter principle such as Bitrex®.

The compounds of the solvents (c) and additives (d), which may optionally be contained in the composition of the fragranced shaped body, must be different from the at least one gelling agent (a) and the at least one fragrance (b). The only exception here is water, which may be contained in all constituents (a) to (d).

In preferred embodiments, in order to produce the fragranced shaped bodies, compositions are used which form translucent, preferably transparent, dimensionally stable, but elastic gels. Preferably, the strength of this gel structure is such that the composition can be formed into a desired shape and maintained under standard conditions (20° C., atmospheric pressure), preferably up to 30° C., more preferably up to 40° C.

The shaped body according to the invention is preferably transparent or translucent, particularly preferably transparent. If a shaped body according to the invention has a residual light output (transmission) of at least 20% in the spectral range between 380 nm and 780 nm, said shaped body is considered to be transparent within the meaning of the invention.

The transparency of the shaped body can be determined using various methods. The Nephelometric Turbidity Unit (NTU) is frequently used as measured value for transparency. It is a unit, used e.g. in water treatment, for measuring turbidity e.g. in liquids. It is a unit of turbidity measured using a calibrated nephelometer. High NTU values are measured for turbid compositions, whereas low values are determined for clear compositions.

The HACH Turbidimeter 2100Q from Hach Company, Loveland, Colo. (USA) is used when the calibration substances StabICal Solution HACH (20 NTU), StabICal Solution HACH (100 NTU) and StabICal Solution HACH (800 NTU) are used, all of which can also be ordered from Hach Company. The measurement is filled with the composition to be analyzed in a 10 ml measuring cuvette having a cap and is carried out at 20° C.

At an NTU value (at 20° C.) of 60 or more, shaped bodies have a perceptible turbidity within the meaning of the invention, as can be seen with the naked eye. It is therefore preferable for the fragranced shaped bodies according to the invention to have an NTU value (at 20° C.) of at most 120, more preferably at most 110, more preferably at most 100, particularly preferably at most 80.

Within the scope of the present invention, the transparency of the fragranced shaped bodies according to the invention is determined by a transmission measurement in the visual light spectrum over a wavelength range of 380 nm to 780 nm at 20° C. For this purpose, a reference sample (water, deionized) is measured in a photometer (Specord S 600 from AnalytikJena) using a cuvette (layer thickness 10 mm) which is transparent in the spectrum to be analyzed. Subsequently, the cuvette is filled with a sample of the fragranced shaped body according to the invention and measured again. As part of the sample preparation, the sample is filled in a liquid state at 80° C. and solidified in the cuvette to form the fragranced shaped body and then measured.

It is preferable for the transparent fragranced shaped body according to the invention to have a transmission (20° C.) of preferably at least 25%, more preferably at least 30%, more preferably at least 40%, in particular of at least 50%, particularly preferably of at least 60%.

It is very particularly preferable for the transparent fragranced shaped body according to the invention to have a transmission (at 20° C.) of at least 30% (in particular of at least 40%, more preferably of at least 50%, particularly preferably of at least 60%) and an NTU value (at 20° C.) of at most 120 (more preferably at most 110, even more preferably at most 100, particularly preferably at most 80).

A "shaped body" is a single body that stabilizes itself in the shape imparted thereto. This dimensionally stable body is formed from a molding compound (e.g. a composition) in such a way that this molding compound is brought into a predetermined shape in a targeted manner, for example by pouring a liquid composition into a casting mold and then curing the liquid composition, for example as part of a sol-gel process. In this case, all conceivable shapes are possible, such as a ball, cube, cuboid, round disk, prism, octahedron, tetrahedron, egg shape, dog, cat, mouse, horse, torso, bust, pillow, automobile, oval disk with embossed trademark, and many others. Preferably, the shape of the fragranced shaped body is lenticular or pastille shaped. This form may preferably be produced by a pastillation process. In other embodiments, the fragranced shaped body has a desired three-dimensional shape, which is preferably produced by using a preformed (casting) mold.

The molded fragranced shaped body preferably has a storage modulus G' of $10^3$ Pascal to $10^8$ Pascal, more preferably $10^4$ Pascal to $10^6$ Pascal, measured with a rotational rheometer using a cone plate measuring system having a 40 mm diameter and 2° opening angle at a temperature of 20° C.

In the context of this invention, the rheological characterization is carried out by means of a rotational rheometer, for example type AR G2 from TA-Instruments or "Kinexus"

from Malvern, using a cone-plate measuring system having a 40 mm diameter and 2° opening angle at a temperature of 20° C. In this case, the rheometer is a shear stress controlled rheometer. However, the determination can also be carried out using other instruments or measurement geometries of comparable specifications.

The measurement of the storage modulus (abbreviation: G') and of the loss modulus (abbreviation: G") (the unit in each case being Pa) is taken using the above-described equipment in an experiment involving oscillating deformation. For this purpose, the linear viscoelastic region is first determined in a stress sweep experiment. In this case, the shear stress amplitude is increased at a constant frequency of, for example, 1 Hz. The moduli G' and G" are plotted in a log-log plot. Either the shear stress amplitude or the (resulting) deformation amplitude can be plotted on the x axis. The storage modulus G' is constant below a certain shear stress amplitude or deformation amplitude, above which it collapses. The break point is expediently determined by applying tangents to the two portions of the curve. The corresponding deformation amplitude or shear stress amplitude is usually referred to as "critical deformation" or "critical shear stress."

In order to determine the frequency dependence of the moduli, a frequency ramp, e.g. between 0.01 Hz and 10 Hz, is performed at a constant deformation amplitude. The deformation amplitude has to be selected such that it is within the linear range, i.e. below the above-mentioned critical deformation. In the case of the compositions according to the invention, a deformation amplitude of 0.1% has been found to be suitable. The moduli G' and G" are plotted against the frequency in a log-log plot.

The fragranced shaped body may preferably have a coating, the composition being coated on the surface. Suitable coating materials are described below.

The fragranced shaped bodies according to the invention are preferably used in washing and/or cleaning processes, more preferably for fragrancing textiles and/or hard surfaces.

The invention further relates to a washing or cleaning agent which comprises or consists of the fragranced shaped body according to the invention.

As already mentioned above, compositions which serve as washing agents preferably contain textile care or textile-softening compounds, according to the list above.

Washing or cleaning agents according to the invention are preferably used in washing or cleaning processes and are preferably suitable for fragrancing soft surfaces or textiles and/or hard surfaces.

By introducing the fragranced shaped bodies produced according to the invention into a washing or cleaning agent, the consumer is preferably provided with a "2-in-1" washing or cleaning agent and does not need to meter two agents or a separate rinse cycle. Since the fragranced shaped bodies produced according to the invention are perfumed, the washing or cleaning agent does not need to be perfumed as well.

The compositions of the fragranced shaped bodies described herein are preferably suitable for conditioning soft surfaces or textiles and are, for this purpose, together with a conventional washing or cleaning agent, brought into contact with the soft surfaces or textiles in the (main) wash cycle of a conventional washing and cleaning process.

If the composition of the fragranced shaped bodies according to the invention is part of a washing or cleaning agent, a solid washing or cleaning agent may preferably be mixed with 1 to 20 wt. %, in particular 5 to 15 wt. %, of the fragranced shaped bodies according to the invention.

The invention further relates to a method for producing fragranced shaped bodies according to the invention, comprising or consisting of the following steps:

(i) optionally blending or mixing the at least one gelling agent (a), the optionally present solvent (c) and/or the optionally present additive (d);
(ii) heating the at least one gelling agent (a) or the mixture from step (i), preferably while stirring, to a temperature of 50 to 200° C., preferably 80 to 150° C., more preferably 130° C.;
(iii) allowing the mixture from step (ii) to cool to a temperature of 40 to 90° C., preferably 60 to 80° C., more preferably 70° C.;
(iv) optionally adding the at least one fragrance (b) and/or the optionally present solvent (c) and/or additives (d), preferably while stirring, to the mixture from step (iii);
(v) dropping the mixture from step (iv) onto a belt or sheet, which is preferably temperature controlled, more preferably at 15 to 30° C., most preferably at 23° C., or filling the mixture from step (iv) into a shaping mold, which is preferably temperature controlled, more preferably at 15 to 30° C., most preferably at 23° C.;
(vi) allowing the mixture from step (v) to cool to room temperature, preferably to 20 to 25° C.;
(vii) optionally also removing the shaped body from step (vi) from the mold;
(viii) optionally coating the mold from step (vi) or (vii) with the at least one fragrance (b) and/or with a powdered material, preferably potato starch, and/or with a water-soluble coating, preferably of polyvinyl alcohol;
(ix) optionally filling the fragranced shaped body according to one of steps (vi), (vii) or (viii).

According to step (i) of the method according to the invention, the at least one gelling agent (a) is optionally blended and mixed with the at least one solvent (c) and/or with the at least one additive (d).

In one embodiment, the mixture from step (i) is then heated to a temperature of 50 to 200° C., preferably 80 to 150° C., more preferably 110 to 140° C., most preferably from 130° C. Preferably, the gelling agent (a) may melt at these temperatures and/or optionally polymerize or crosslink with the added solvent (c).

In another embodiment, only the gelling agent (a) is heated to a temperature of 50 to 200° C., preferably 80 to 150° C., more preferably 110 to 140° C., most preferably 130° C. In this embodiment, the gelling agent (a) is melted alone.

Preferably, the heating step (ii) is carried out while stirring the mixture from step (i) or the gelling agent (a).

In preferred embodiments, the temperature used is at most 20° C. higher than the melting temperature of the at least one gelling agent. The melting process according to step (ii) can be carried out with all methods and devices known to a person skilled in the art for this purpose.

After a homogeneous mixture has preferably been achieved in step (ii), the mixture from step (ii) is then cooled in step (iii) to a temperature of 40 to 90° C., preferably 60 to 80° C., more preferably from 70° C.

At this temperature, it is possible to add the at least one fragrance (b) according to step (iv) of the described method to the mixture in order to obtain the composition according to the invention. This step is carried out according to step (iv) of the described process, preferably while stirring the mixture. In step (iv), optional solvents (c) or additives (d) may also be added.

Preferably, fragrance capsules are added in the form of a capsule slurry, which has already been defined in more detail above. The free fragrances can also be added in a liquid, aqueous composition or solution, and so as to be anhydrous.

In continuous processes, the individual constituents of the composition can be supplied via individual feed lines or metering streams. The flow can optionally be controlled by means of flow rate measurement of the individual metering streams, i.e. of the gelling agent, of the fragrance stream and, if appropriate, of further ingredient streams.

The mixing of the combined metering streams can then be carried out, in each case directly after the respective metering or downstream after metering a plurality or all ingredients, by suitable mixers, such as conventional static or dynamic mixing aggregates.

In preferred embodiments, step (v) of the method according to the invention is carried out in such a way that the composition of the fragranced shaped body obtained in step (iv) is passed through a nozzle, preferably at a slight overpressure.

A preferred method is, for example, a pastillation method in which the heated composition from step (iv) is dropped onto a cooling belt or sheet, which is preferably temperature controlled, more preferably at 15 to 30° C., even more preferably 20 to 25° C., most preferably at 23° C. Applying the composition by dropping may preferably be carried out at a suitable overpressure, depending on the viscosity of the composition. It is preferred for the composition to solidify on the cooling belt or sheet during cooling and form a dimensionally stable gel. The resulting fragranced shaped bodies are preferably lenticular or pastille shaped.

It is preferred according to the invention for the all of the composition according to the invention to be dropped onto the cooling belt or sheet. However, it would also be possible, although not preferred, for the optional step (iv) of the described method to be omitted and for the at least one fragrance (b) to be applied to the fragranced shaped body only after the composition has been dropped onto the cooling belt or sheet, for example, by the shaped body produced being coated with the fragrance.

In a further embodiment, the fragranced shaped body in step (v) can also be produced by means of an extrusion method, for example by pressing the composition in an extruder to form a strand. The final shape of the fragranced shaped body can be obtained after cooling (vi) by knocking off or cutting off the strand and then reworking the shape, for example by means of spheronization or pressing, according to step (vii). Here, too, the fragrances may already be contained in the composition or subsequently applied to the shape in step (viii).

In one embodiment, the composition from step (iv) is filled into a shaping mold which is preferably temperature controlled, more preferably at 15 to 30° C., even more preferably at 20 to 25° C., most preferably at 23° C. As a result, the three-dimensional shape of the fragranced shaped body, which forms a dimensionally stable gel by solidifying the composition according to the invention during cooling, can be obtained. After removal of the fragranced shaped body from the shaping mold it can be post-processed in step (vii) to achieve the final shape, preferably a kitten shape. However, any other geometric or figurative design of the shape is possible, for example a gummy bear shape, slices, balls, cuboids, scales, cylinders, cones and so on.

Preferably, the fragranced shaped bodies have spatial dimensions of 0.5 to 10 mm, more preferably 0.8 to 7 mm, most preferably 1 to 3 mm. Lenticular fragranced shaped bodies may, for example, have a diameter of 5 to 10 mm in length and width and a height of about 1 to 5 mm. The weight of the individual fragranced shaped bodies is preferably 2 to 150 mg, more preferably 5 to 10 mg.

The fragranced shaped bodies according to the present invention are preferably gel-like, dimensionally stable, elastic, homogeneous shaped bodies. The fragranced shaped body is preferably a dimensionally stable gel at room temperature, preferably up to 30° C., more preferably up to 40° C. is.

In various embodiments of the invention, the fragranced shaped bodies according to the invention are coated according to step (viii) of the method described. Suitable coating agents are, for example, tablet coatings known from pharmaceutical literature. A preferred coating is based, for example, on a polyvinyl alcohol (PVA). However, the pastilles can also be waxed, i.e. coated with a wax, or, to protect against caking (agglomeration), can be powder-coated with a powdered material, for example a release agent. A preferred powdered material is, for example, potato starch. It is preferred for the coating not to consist of PEG or to comprise it in any significant amount (>10 wt. %, based on the coating).

In certain embodiments, the coating from step (viii) may contain or consist of the at least one fragrance (b). The formed fragranced shaped body from step (vi) or (vii) is preferably coated with this coating. The coating may, for example, also contain a mixture of fragrance (b), the powdery material or the water-soluble coating. Several coatings of one or more substances, one on top of the other, are also included according to the invention.

Subsequently, the fragranced shaped body according to the invention can be filled in step (ix). The filling can take place after step (vi) even after 1 minute to 1 hour, preferably after 5 to 15 minutes.

The method according to the invention may be a batch or continuous method. In a preferred embodiment, steps (i) to (iv) for achieving the composition according to invention may be carried out in a single container. In a different embodiment, steps (i) to (iv) are carried out in different containers, which are preferably interconnected. The mixture is preferably conveyed between the containers, for example, pumped, and then dropped, for example via a nozzle, onto the belt or sheet. Feeding the constituents and the forwarding can be controlled automatically.

The following points summarize, but do not limit, specific embodiments of the invention:

1. A fragranced shaped body comprising or consisting of a composition obtained by bringing the following components into contact:
   (a) at least one gelling agent having a molar mass of <2000 g/mol,
   (b) at least one fragrance,
   (c) optionally at least one solvent, and
   (d) optionally at least one additive.
2. The fragranced shaped body according to point 1, wherein the composition is a low-water composition containing 0.001 to 40 wt. % of water, based on the total weight of the composition.

3. The shape according to point 1, wherein the composition is a water-rich composition containing 40 to 90 wt. % of water, based on the total weight of the composition.
4. The fragranced shaped body according to one of points 1 to 3, wherein the at least one gelling agent has a molar mass of <1000 g/mol.
5. The fragranced shaped body according to one of points 1 to 4, wherein the at least one gelling agent is selected from the group consisting of benzylidene alditol compound, hydroxystearic acid, hydrogenated castor oil, diarylamidocystine compound, N—($C_8$-$C_{24}$) hydrocarbylglyconamide, diketopiperazine compound, 2-methyl-acrylic acid-2-ureido ethyl ester and mixtures thereof, wherein the at least one gelling agent is preferably dibenzylidene sorbitol.
6. The fragranced shaped body according to one of points 1 to 5, wherein the at least one gelling agent, preferably dibenzylidene sorbitol, is contained in an amount of 0.01 to 20 wt. %, preferably 0.5 to 10 wt. %, more preferably 1 to 10 wt. %, most preferably 3 to 8 wt. %, based on the total weight of the composition.
7. The fragranced shaped body according to one of points 1 to 6, wherein the at least one fragrance is at least one free perfume compound, at least one fragrance capsule or a mixture thereof, wherein the at least one fragrance capsule is preferably present as a fragrance capsule slurry, and/or wherein the at least one fragrance is contained in an amount of 0.1 to 20 wt. %, preferably 1 to 18 wt. %, more preferably 4 to 14 wt. %, based on the total weight of the composition.

8. The fragranced shaped body according to one of points 1 to 7, the at least one solvent is an alcohol having at least one OH group, preferably selected from the group consisting of glycerol carbonate, glycerol, triethylene glycol and mixtures thereof, and/or wherein the at least one solvent is contained in an amount of 0.01 to 95 wt. %, preferably 70 to 93 wt. %, based on the total weight of the composition.

9. The fragranced shaped body according to one of points 1 to 8, wherein the at least one additive is contained in an amount of 0.0001 to 40 wt. %, and/or wherein the at least one additive comprises at least one dye, which is preferably contained in an amount of 0.001 to 0.5 wt. %, more preferably 0.01 to 0.3 wt. %, based on the total weight of the composition, and/or wherein the at least one additive contains at least one textile care compound, wherein this compound is preferably selected from textile-softening compounds, silicone oils, anti-redeposition agents, optical brighteners, graying inhibitors, shrinkage preventers, anti-crease agents, dye transfer inhibitors, antimicrobial active ingredients, germicides, fungicides, antioxidants, antistatic agents, ironing aids, repellants, impregnating agents, anti-swelling and anti-slip agents, UV absorbers and mixtures thereof.

10. The fragranced shaped body according to one of points 1 to 9, wherein the fragranced shaped body has a storage modulus G' of $10^3$ Pascal to $10^8$ Pascal, preferably $10^4$ Pascal to $10^6$ Pascal, measured with a rotational rheometer using a cone-plate measuring system with a 40 mm diameter and a 2° opening angle at a temperature of 20° C.
11. The fragranced shaped body according to one of points 1 to 10, characterized in that the fragranced shaped body is transparent or translucent, preferably transparent.
12. The fragranced shaped body according to one of points 1 to 11, wherein the composition is coated on the surface.
13. A washing or cleaning agent comprising or consisting of the fragranced shaped body according to one of points 1 to 12.
14. A method for producing the fragranced shaped body according to one of points 1 to 12, comprising or consisting of the following steps:

(i) optionally blending or mixing the at least one gelling agent (a), the optionally present solvent (c) and/or the optionally present additive (d);

(ii) heating the at least one gelling agent (a) or the mixture from step (i), preferably while stirring, to a temperature of 50 to 200° C., preferably 80 to 150° C., more preferably 130° C.;

(iii) allowing the mixture from step (ii) to cool to a temperature of 40 to 90° C., preferably 60 to 80° C., more preferably 70° C.;

(iv) optionally adding the at least one fragrance (b) and/or the optionally present solvent (c) and/or additives (d), preferably while stirring, to the mixture from step (iii);

(v) dropping the mixture from step (iv) onto a belt or sheet, which is preferably temperature controlled, more preferably at 15 to 30° C., most preferably at 23° C., or filling the mixture from step (iv) into a shaping mold, which is preferably temperature controlled, more preferably at 15 to 30° C., most preferably at 23° C.;

(vi) allowing the mixture from step (v) to cool to room temperature, preferably to 20 to 25° C.;

(vii) optionally also removing the shaped body from step (vi) from the mold;

(viii) optionally coating the mold from step (vi) or (vii) with the at least one fragrance (b) and/or with a powdered material, preferably potato starch, and/or with a water-soluble coating, preferably of polyvinyl alcohol;

(ix) optionally filling the fragranced shaped body according to one of steps (vi), (vii) or (viii).

15. The method according to point 14, wherein the fragranced shaped body (1) is brought into lenticular form (pastille) in step (v) by pastillation, or (2) is brought into a desired three-dimensional shape in step (v) by using a prefabricated mold.

16. The use of the fragranced shaped body according to one of points 1 to 12 for fragrancing soft surfaces or textiles, preferably in a washing process, or for fragrancing hard surfaces, preferably in a cleaning process.

The present invention is explained in further detail in a non-limiting manner in the following embodiments.

EXAMPLES

Example 1: Producing the Fragranced Shaped Bodies According to the Invention in the Form of Pastilles

TABLE 1

Compositions according to the invention of the fragrance pastilles (all values given in wt. %)

| Material | E1 | E2 | E3 | E4 | E5 | E6 |
|---|---|---|---|---|---|---|
| Glycerol carbonate | 42.50 | — | — | — | — | — |
| Glycerol | 42.50 | — | — | — | — | — |
| Triethylene glycol | — | 93.37 | 91.75 | 90.33 | 92.34 | 90.03 |
| Free perfume | 5.00 | 1.63 | 3.25 | 2.17 | 4.33 | 1.50 |
| Perfume capsule slurry with water (50%) | 5.00 | — | — | — | — | — |
| Dibenzylidene sorbitol | 5.00 | 5.00 | 5.00 | 7.50 | 3.33 | 8.47 |

TABLE 2

Compositions according to the invention of the fragrance pastilles (all values given in wt. %)

| Material | E7 | E8 | E9 | E10 | E11 | E12 |
|---|---|---|---|---|---|---|
| Glycerol carbonate | — | — | — | 11.31 | — | — |
| Glycerol | — | — | 22.50 | — | 11.09 | — |
| Triethylene glycol | 82.50 | 90.00 | 67.50 | 78.49 | 80.64 | 84.20 |
| Free perfume | 5.00 | 2.50 | 2.50 | 2.00 | 1.96 | 5.40 |
| Perfume capsule slurrywith water (50%) | 5.00 | 2.50 | 2.50 | 2.00 | 1.96 | 5.40 |
| Dibenzylidene sorbitol | 7.50 | 5.00 | 5.00 | 6.20 | 4.35 | 5.00 |

The fragrance pastilles are produced by gelling the perfume oil compositions E1 to E12.

For the production, the ingredients, with the exception of fragrance capsules (capsule slurry) and free perfume, were brought to a temperature of 130° C. and mixed together. Thereafter, this mixture was cooled to 70° C. and the fragrance microcapsules and the free perfume added and the mixture homogenized. This resulted in a mixture that could be readily further processed by pastillation. The liquid mixture was then dropped onto a temperature controlled (23° C.) sheet and cooled to ambient temperature. After about 10 minutes, the pastilles thus produced reached a strength suitable for filling.

Transparent, homogeneous fragrance pastilles were obtained which were stable up to 40° C. The fragrance capsules are soluble in water.

Compared with commercially available fragranced shaped bodies based on PEG, the fragranced shaped bodies according to the invention contain higher water concentrations and lower concentrations of the carrier material (in this case gelling agent). As a result, lower amounts of waste substances are released into the environment, because the proportion of carrier material can be reduced.

Example 2: Producing the Fragranced Shaped Bodies According to the Invention in the Form of Kittens For the production, the ingredients, with the exception of fragrance capsules (capsule slurry) and free perfume, were brought to a temperature of 130° C. and mixed together. Thereafter, this mixture was cooled to 70° C. and the fragrance microcapsules and the free perfume added and the mixture homogenized. Subsequently, the hot solution was poured into a prefabricated mold and cooled to room temperature in order to gel. After gelling, the kittens were removed from the mold and the fragranced shaped bodies according to the invention were obtained.

Example 3: Coating the Fragranced Shaped Bodies According to the Invention

In order to avoid a syneresis process (exudation of the gel), the surface of the fragranced shaped bodies according to the invention can be coated with a powdered material (e.g. potato starch), taking into account the water solubility of the shaped body. Moreover, the shaped bodies according to the invention can be coated with a water-soluble coating.

What is claimed is:

1. A fragranced shaped body comprising:

(a) at least one gelling agent having a molar mass of <2000 g/mol, having the formula:

(GB-I)

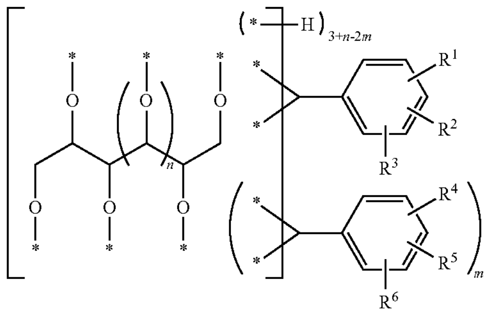

in which (i) *- represents a covalent single bond between an oxygen atom of the alditol backbone and the provided functional group;

(ii) n represents 0 or 1;

(iii) m represents 0 or 1;

(iv) $R^1$, $R^2$ and $R^3$ independently of one another represent a hydrogen atom, a halogen atom, a $C_1$-$C_4$ alkyl group, a cyano group, a nitro group, an amino group, a carboxyl group, a hydroxyl group, a C(═O)—NH—$NH_2$ group, a —NH—C(═O)—($C_2$-$C_4$-alkyl) group, a $C_1$-$C_4$ alkoxy group, a $C_1$-$C_4$ alkoxy $C_2$-$C_4$ alkyl group, with two of the functional groups forming, together with the remainder of the molecule, a 5-membered or 6-membered ring;

(v) $R^4$, $R^5$ and $R^6$ independently of one another represent a hydrogen atom, a halogen atom, a $C_1$-$C_4$ alkyl group, a cyano group, a nitro group, an amino group, a carboxyl group, a hydroxyl group, a C(=O)—NH—$NH_2$ group, a —NH—C(=O)—($C_2$-$C_4$-alkyl) group, a $C_1$-$C_4$ alkoxy group, a $C_1$-$C_4$ alkoxy $C_2$-$C_4$ alkyl group, with two of the functional groups forming, together with the remainder of the molecule, a 5-membered or 6-membered ring;

(b) at least one fragrance in the form of microcapsules, wherein the microcapsules have a wall thickness of 0.05 to 10 μm;

(c) at least one solvent selected from the group consisting of water, methanol, ethanol, 1-propanol, 2-propanol, 1-butanol, tert-butanol, glycerol carbonate, ethylene glycol, triethylene glycol, 1,2-propanediol, dipropylene glycol, glycerol, 3-methoxy-3-methyl-1-butanol; and mixtures thereof; and (d) at least one additive; and wherein the fragrance shaped body is 2-150 mg.

2. The fragranced shaped body according to claim 1, wherein the composition comprises 0.001 to 40 wt. % of water, based on the total weight of the composition.

3. The fragranced shaped body according to claim 1, wherein the composition comprises 40 to 90 wt. % of water, based on the total weight of the composition.

4. The fragranced shaped body according to claim 1, wherein the at least one gelling agent has a molar mass of <1000 g/mol.

5. The fragranced shaped body according to claim 1, wherein the at least one gelling agent, is contained in an amount of 0.01 to 20 wt. %, based on the total weight of the composition.

6. The fragranced shaped body according to claim 1, wherein the at least one fragrance in the form of microcapsules is present as a fragrance capsule slurry and wherein the fragranced shaped body further comprises at least one further fragrance that is at least one free perfume compound, and/or wherein the at least one fragrance is contained in an amount of 0.1 to 20 wt. %, based on the total weight of the composition.

7. The fragranced shaped body according to claim 6, wherein the at least one gelling agent is contained in an amount of 0.5 to 10 wt. %, based on the total weight of the composition.

8. The fragranced shaped body according to claim 6, wherein the at least one gelling agent is contained in an amount of 1 to 10 wt. %, based on the total weight of the composition.

9. The fragranced shaped body according to claim 6, wherein the at least one gelling agent is contained in an amount of 3 to 8 wt. %, based on the total weight of the composition.

10. The fragranced shaped body according to claim 1, wherein the at least one solvent is an alcohol in an amount of 0.01 to 95 wt. %, based on the total weight of the composition.

11. The fragranced shaped body according to claim 10, wherein the at least one fragrance is contained in an amount of 1 to 18 wt. %, based on the total weight of the composition.

12. The fragranced shaped body according to claim 10, wherein the at least one fragrance is contained in an amount of 4 to 14 wt. %, based on the total weight of the composition.

13. The fragranced shaped body according to claim 1, wherein the fragranced shaped body has a storage modulus G' of $10^3$ Pascal to $10^8$ Pascal measured with a rotational rheometer using a cone-plate measuring system with a 40 mm diameter and a 2° opening angle at a temperature of 20° C.

14. The fragranced shaped body according to claim 13, wherein the at least one solvent is an alcohol having at least one OH group, selected from the group consisting of glycerol carbonate, glycerol, triethylene glycol and mixtures thereof.

15. The fragranced shaped body according to claim 13, wherein the at least one solvent is contained in an amount of 70 to 93 wt. %, based on the total weight of the composition.

16. The fragranced shaped body according to claim 1, wherein the fragranced shaped body has a storage modulus G' of $10^4$ Pascal to $10^6$ Pascal, measured with a rotational rheometer using a cone-plate measuring system with a 40 mm diameter and a 2° opening angle at a temperature of 20 C.

17. A method for producing the fragranced shaped body according to claim 1 comprising the steps:

(i) blending or mixing the at least one gelling agent (a), the at least one solvent (c) and/or the at least one additive (d);

(ii) heating the at least one gelling agent (a) or the mixture from step (i), while stirring, to a temperature of 50 to 200° C.;

(iii) allowing the mixture from step (ii) to cool to a temperature of 40 to 90° C.;

(iv) adding the at least one fragrance (b) and/or the at least one solvent (c) and/or at least one additives (d), while stirring, to the mixture from step (iii);

(v) dropping the mixture from step (iv) onto a belt or sheet, which is temperature controlled at 15 to 30° C., or filling the mixture from step (iv) into a shaping mold, which is temperature controlled at 15 to 30° C.;

(vi) allowing the mixture from step (v) to cool to room temperature.

18. A fragranced shaped body comprising:

(a) at least one gelling agent having a molar mass of <2000 g/mol, having the formula:

(GB-I)

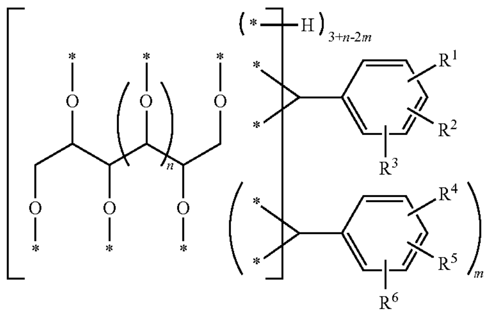

in which (i) *-represents a covalent single bond between an oxygen atom of the alditol backbone and the provided functional group;

(ii) n represents 0 or 1;

(iii) m represents 0 or 1;

(iv) $R^1$, $R^2$ and $R^3$ independently of one another represent a hydrogen atom, a halogen atom, a $C_1$-$C_4$ alkyl group, a cyano group, a nitro group, an amino group, a carboxyl group, a hydroxyl group, a C(═O)—NH—NH2 group, a-—NH—C(═O)—($C_2$-$C_4$-alkyl) group, a $C_1$-$C_4$ alkoxy group, a $C_1$-$C_4$ alkoxy $C_2$-$C_4$ alkyl group, with two of the functional groups forming, together with the remainder of the molecule, a 5-membered or 6-membered ring;

(v) $R^4$, $R^5$ and $R^6$ independently of one another represent a hydrogen atom, a halogen atom, a $C_1$-$C_4$ alkyl group, a cyano group, a nitro group, an amino group, a carboxyl group, a hydroxyl group, a C(═O)—NH—$NH_2$ group, a —NH—C(═O)—($C_2$-$C_4$-alkyl) group, a $C_1$-$C_4$ alkoxy group, a $C_1$-$C_4$ alkoxy $C_2$-$C_4$ alkyl group, with two of the functional groups forming, together with the remainder of the molecule, a 5-membered or 6-membered ring;

(b) at least one fragrance, wherein the fragrance has a molar mass of 40 to 700 g/mol;

(c) at least one solvent that is glycerol, glycerol carbonate, or a mixture thereof, and (d) at least one additive; and wherein the fragranced shaped body is 2-150 mg.

19. The fragranced shaped body according to claim 18, further comprising at least one further solvent selected from the group consisting of water, methanol, ethanol, 1-propanol, 2-propanol, 1-butanol, tert-butanol, ethylene glycol, triethylene glycol, 1,2-propanediol, dipropylene glycol, 3-methoxy-3-methyl-1-butanol, and mixtures thereof.

20. The fragranced shaped body according to claim 18, wherein the at least one fragrance is at least one free perfume compound, at least one fragrance capsule or a mixture thereof, wherein the at least one fragrance capsule is present as a fragrance capsule slurry, and/or wherein the at least one fragrance is contained in an amount of 0.1 to 20 wt. %, based on the total weight of the composition.

* * * * *